UNITED STATES PATENT OFFICE.

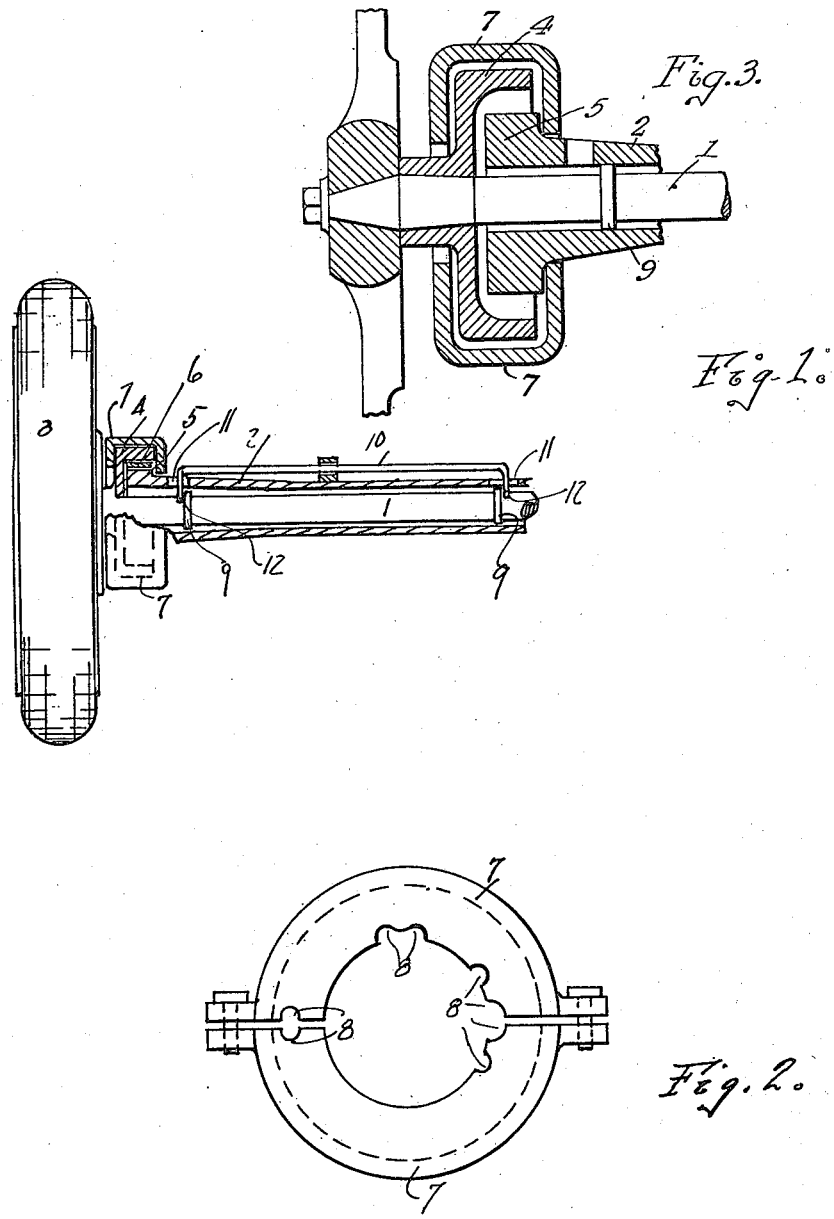

FRANK J. HEMEN, OF SEATTLE, WASHINGTON.

AXLE SAFETY DEVICE.

1,269,180. Specification of Letters Patent. Patented June 11, 1918.

Application filed June 19, 1916. Serial No. 104,357.

*To all whom it may concern:*

Be it known that I, FRANK J. HEMEN, a citizen of the United States, and a resident of Seattle, in the county of King and State of Washington, have invented certain new and useful Improvements in Axle Safety Devices, of which the following is a full, true, and exact specification.

My invention relates to axle safety devices and has for its principal object to provide an improved and novel device for preventing a broken axle shaft on an automobile from separating and allowing the wheel and a part of the axle to part from the machine; to provide indicating means for showing the presence of a broken shaft.

Other objects will appear as my invention is more fully explained in the following specification, illustrated in the accompanying drawings and pointed out in the appended claims:

In the drawings, Figure 1 is a side elevation of my device with parts broken away. Fig. 2 is an enlarged end elevation of my device. Fig. 3 is an enlarged sectional elevation of a section of my device shown in detail.

Referring more particularly to the drawings, numeral 1 indicates an axle shaft, 2 an axle and 3 a traction wheel. An emergency brake band drum 4, rim 5, and band 6 are provided, the drum is secured to the wheel 3 and the rim 5 is integral with the axle 2.

In many makes of cars when the axle shaft 1 breaks and the emergency brakes are applied the wheel 3 and attached fragment of the shaft are thrown freely from the axle, thus allowing the rear end of the machine to fall to the ground.

My device includes a hollow and internally flanged housing 7 which is made separable along a diametrical line. The housing 7 fits snugly around the axle 2 and is slightly separated from the brake drum 4. The flanges of the housing 7 fit on either side of the brake and the inner flange extends inwardly far enough to engage the side of the rim 5. Housing 7 is cut away as at 8 to fit around bolt heads and rods.

In case the shaft breaks the flanges of the housing will retain the brake drum and the rim 5 from separating and consequently will hold the wheel in place. In order to indicate the presence of a broken axle I provide a device which includes a pair of collars 9, one secured adjacent either end of shaft 1, a light indicator rod 10 which passes through openings 11 in axle 2 and which has ends 12 projecting on the outside of collars 9. The ends 12 fit close to the collars 9. When the shaft 1 breaks between the collars 9 the slight separation or elongation of the shafting breaks the indicator bar 10, thus showing the presence of a broken axle shaft as the indicator bar is easily seen from outside the car.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In a device of the class described, the combination of an axle having a traction wheel secured thereto, an outer casing around the said axle, a brake drum secured to said wheel, a flanged housing removably attached to said outer casing and inclosing said brake drum, whereby said wheel is prevented from separating from the outer casing, and indicating means, whereby the presence of a broken axle shaft is indicated.

2. In a device of the class described, the combination of a vehicle axle, a traction wheel secured to one end of said axle, a tubular outer casing inclosing said axle, a brake drum secured to said wheel, and a flanged outer housing inclosing the said brake drum and engaging a projection on the said outer casing and removably attached thereto, whereby the wheel and its axle are prevented from separating from the outer casing.

FRANK J. HEMEN.

Copies of this patent may be obtained for five cents each, by addressing the "Commissioner of Patents, Washington, D. C."